Jan. 5, 1932.   C. E. WEBBER   1,840,070
WHEEL LUG CLEANING DEVICE
Filed June 26, 1930
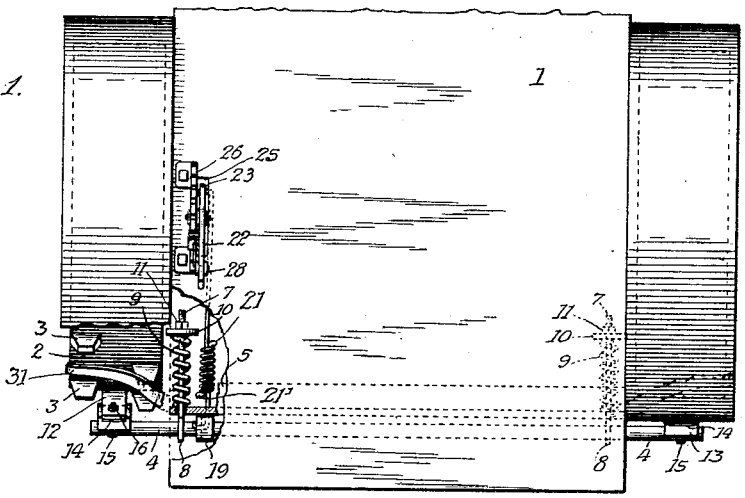
Inventor:
Charles E. Webber.
By: Linton, Kellogg and Smith
Attys.
Witness:
R. B. Davison Patented Jan. 5, 1932

1,840,070

UNITED STATES PATENT OFFICE

CHARLES E. WEBBER, OF PONTIAC, ILLINOIS

WHEEL LUG CLEANING DEVICE

Application filed June 26, 1930. Serial No. 463,844.

This invention relates to improvements in cleaning or scraping devices, for use in connection with the traction lugs or cleats of tractor driving wheels, such as are illustrated and described in my United States Patent Number 1,774,463, having for an object to provide an improved form or construction of mounting for the cleaner carrying shaft upon the tractor body or platform, whereby to permit of lateral movement of the shaft in a direction to allow automatic, disengagement of such cleaners from the traction lugs should they, for any reason, become engaged therewith during rotation of the tractor drive wheels, thus avoiding the doing of damage to the lugs and the cleaners, and at the same time, to insure the retention of such cleaners in yieldable engagement with the equipped tractor wheel treads for positively removing any and all material accumulation of mud or other matter therefrom, hence, insuring proper traction.

It is furthermore an equally important object of the invention to provide the cleaner carrying shaft of the device with an automatic compensating connection between such shaft and the manual operating lever therefor mounted upon the tractor platform or upon some other appropriate portion of the tractor construction, said connection being so constructed as to automatically allow for lateral or outward movement of the cleaner carrying shaft with respect to the manual operating lever without disturbing said lever in a previously adjusted position and likewise, without damaging said lever or its particular mounting upon the tractor construction.

Yet another object of the invention may be stated to reside in the provision of novelly constructed and assembled wheel lug cleaning devices or cleaners, these cleaners being removably yet fixedly mounted upon appropriate portions of the carrying shaft provided therefor and each being supplied with attaching brackets; the cleaners and their respective attaching brackets being assembled and fixedly connected to the carrying shaft at but a single point and with a single securing or fastening device, thus, permitting their removal or replacement, as conditions or preference may dictate, by comparatively unskilled labor and without disturbing the mounting of the carrying shaft in any way.

It is also an object of the invention to provide the cleaning device with mud or foreign matter fending devices, such devices being fixedly mounted upon an appropriate portion of the tractor body construction and being so formed and positioned with respect to the tractor drive wheel treads as to automatically sweep or clear mud or other foreign matter away from the wheel treads and consequently upon this, to prevent the accumulation of mud or foreign matter between the wheel treads and their respective fenders or guards to such as extent as might otherwise normally impede their rotation or driving functions.

Other objects of the invention will be in part obvious and in part pointed out hereinafter.

In order that the invention and its mode of operation may be readily understood by those skilled in the art, I have in the accompanying drawings and in the detailed following description based thereupon, set out one possible embodiment of my invention.

In these drawings:

Figure 1 is a fragmentary top plan view of a portion of a tractor, the driving wheels of which are equipped with the improved lug cleaning device and the mud sweeping or clearing fenders, a portion of the tractor platform and one of the wheel fenders being broken away to illustrate the spring mounting of the cleaner carrying shaft upon the tractor platform together with the mounting and arrangement of the mud clearing or sweeping fenders with respect to the driving wheel treads and their particular fenders or guards.

Figure 2 is a fragmentary end elevation of the tractor showing the arrangement of the construction of the wheel lug cleaning device.

Figure 3 is a fragmentary vertical and longitudinal section therethrough, and

Figure 4 is an enlarged fragmentary detail in longitudinal section through one of the wheel lug cleaning devices showing its mounting upon the carrying shaft.

Having more particular reference to the drawings, in connection with which like characters of reference will designate corresponding parts throughout, I have shown for purposes of illustration in this particular embodiment of the invention, the cleaning device employed in connection with a tractor wherein the numeral 1 indicates the tractor platform or body provided with the usual driving wheels 2 having traction lugs 3 mounted upon the tread portions thereof. In this connection, it will be noted that the traction lugs are fixedly mounted upon the driving wheel treads in circumferentially disposed series and that the same are mounted in relatively alternate fashion upon their particular wheel treads, hence, providing an intermediate circumferential path or clearance therebetween, as is well shown in the Figures 1 and 2.

With a view toward providing means for effectually maintaining the treads of the drive wheels substantially free of mud or other traction impeding accumulations, during operation of the tractor, I provide a cleaner device carrying shaft 4, this shaft being supported upon an angle bar bracket 5, bolted or otherwise secured to the underside of the tractor platform 1, preferably, in proximity to one end thereof and likewise, in proximity to the tread portions of the drive wheels 2, by bolts or other suitable fastening devices 6 which are passed through portions of such supporting bracket and through adjacent portions of the platform 1. In this connection, it is to be noted that the supporting bracket 5 is disposed transversely of the platform 1 and that it is of a length approximately corresponding to the width of said platform.

Supporting arms or rods (two in number), each designated by the numeral 7 are slidably received through suitable openings formed in the depending portion of the supporting bracket 5 and are thus, supported by such bracket. These supporting arms 7 are disposed transversely of the supporting bracket 5 and longitudinally of the tractor platform adjacent to the opposite sides of the latter.

Upon the outer ends of each of the supporting arms 7, eyes or circular bearings 8 are formed. The diameters of these bearings 8 are such as to snugly and rotatably receive the carrying shaft 4 therein and by consequence, it will be understood that such shaft 4 will be effectually rotatably supported transversely of the tractor platform 1 in the position hereinbefore indicated. Expansible coiled springs 9 are closely engaged over the opposite portions of each as the arms 7, and as shown in the Figure 3, certain of the ends of these springs have bearing upon adjacent portions of the inner side of the depending part of the supporting bracket 5, while the remaining or normally inner ends of such springs have bearing upon rounded bosses formed integral with washers or followers 10 slidably engaged over the normally inner extremities of the supporting arms 7, these followers 10 being secured in suitably adjusted positions upon the inner extremities of the arms through the medium of locking nuts 11 which are turned into engagement with the screw threaded extremities of the arms as is fully shown in the Figure 3.

Traction lug cleaners are mounted upon each of the extremities or opposite end portions of the shaft 4, and as shown in the Figure 4, these cleaners each comprise metal fingers of approximate lengths and thicknesses, indicated by the numeral 12. Attaching brackets preferably consisting of metal castings 13 are supplied each of the fingers 12 and as shown in the Figure 4, these castings consist of blocks having semi-circular transversely disposed seats formed in their normally inner sides and longitudinally disposed seats or channels formed in their normally outer sides. The upper ends of each of the fingers 12 of the cleaners are snugly received in the longitudinally disposed channels, formed in the normally outer sides of the brackets 13, while said fingers are preferably braced longitudinally throughout the greater portions of their respective lengths by bracing bars 13 which, likewise, are seated in the longitudinal channels of the brackets 13 inwardly of the fingers 12. To connect or attach the cleaners, i. e., the fingers 12 to the carrier shaft 4, an opening is formed in the normally upper portion of each and similarly, an opening is formed in the corresponding portions of the bracing arms 14 and said brackets 13. Through these openings, a connecting bolt 15 is passed, extending diametrically through the adjacent portion of the carrying shaft 4, whereupon a locking nut 16 is turned into engagement with the screw threaded extremity thereof. Thus, by means of this single bolt 15, it will be understood that the assembly making up each of the cleaners will be clearly and substantially rigidly fastened or secured to the carrying shaft 4. If desired, the outer or free extremities of each of the longitudinal bracing arms 14 may be attached to the adjacent portions of their respective fingers 12 by passing rivets 17 or similar fastening devices therethrough.

The mounting of the tractor wheel lug cleaning devices upon the opposite ends of the shaft 4 is such that under normal conditions, the free extremities of the cleaners will engage with that portion of each of the tractor wheel treads intermediately of the circumferentially disposed series of traction lugs 3, as is well shown in the Figure 2. Because of this, it will be understood that with such engagement of the free extremities of the cleaners with the tractor wheel treads, such treads will be braced substantially free of mud or similar accumulations thereupon during rotation or travel of the tractor wheels over the surface of a field or way.

In order that the cleaners will be normally engaged with the tractor wheel treads in the manner above indicated, I fixedly engage with an intermediate portion of the carrying shaft 4 a bearing collar 18, said collar carrying an arm 19 having its free extremity pivotally engaged by one section of a connecting rod, indicated for convenience herein by the numeral 20. The remaining or normally inner end of this connecting rod section is bent at substantially right angles upon itself as indicated by the numeral 21. A second connecting rod section 25, preferably of a length greater than that of the section 20, is adapted to be arranged in parallel and overlapping relationship to the normally inner portion of said section 20 and it too, as the adjacent extremity thereof formed with a right angularly bent finger or extension 21 while the remaining portion thereof is pivotally engaged with the lower end of a manual operating lever 22, as indicated at 23.

This manual operating lever 22 is preferably mounted upon a supporting bracket 24 fixedly secured to one side of the tractor platform 1, in the manner as is illustrated in the Figures 1 and 3; the lower end portion of the lever 22 extending through a slot or way 25 formed in the platform 1 whereby to permit the connection indicated at 23, while the bracket 24 upon which said lever is mounted is provided with the usual toothed segments 26 adapted to be detachably engaged by a spring pressed pawl 27 slidably mounted upon an appropriate portion of the lever 22 and adapted to be manually actuated through the medium of a secondary lever 28, pivotally mounted upon the operating lever 22 adjacent the handle portion thereof, and is clearly shown in the Figure 3.

Engaged about the parallel and overlapping portions of the sections 20 and 20' of the connecting rod construction is a coiled spring 29, the opposite extremities of which have bearing engagement with the right angularly disposed fingers or extensions 21 and 21'. Because of this inter-positioning of the coiled spring 29 with respect to the overlapping portions of the connecting rod sections 20 and 20', it will be readily understood that an automatic compensating connection is effected as between said connecting rod sections and that because of this, yieldable sliding movement will be permitted between said sections, though the sections will be automatically returned to their normal positions under the spring or resilient urge of the coiled spring 29, as is illustrated in the Figure 1.

The tractor drive wheels, as is usual in tractor constructions, are each provided with the usual sheet metal fenders or guards 30, these guards being usually supported upon the opposite sides of the tractor platform 1 and arranged directly over but in spaced relation to the normal upper portions of the driving wheel treads, as is shown in the accompanying drawings. To prevent the possibility of accumulations of mud or foreign matter or débris as between the upper portions of the tractor drive wheel treads and these fenders 30, I provide each of the driving wheels with sweeping or fender arms 31. Each of these fender arms consist of single pieces of metal having a slight inherent spring or resiliency, and as is shown in the Figures 1 and 2 each of these pieces of metal are curved upon themselves so as to be disposed obliquely across the substantially upper portions of the driving wheel treads; the inner extremities of each of the fenders being bolted or otherwise fixedly secured to adjacent portions of the tractor platform through bolts or similar fastening devices 32. Because of the oblique disposition of the fenders 31 over the tread portions of the driving wheels, that is, those portions of the tractor driving wheels adjacent the fenders or guards 30, and likewise, because of the curvature of said fenders 31, it will be understood that with rotation of the driving wheels thereby, said fenders 31 will serve as a means for effectually sweeping excessive accumulations of mud or débris from the driving wheel treads and will positively prevent the building up of such accumulations as between said wheel treads and the fenders or guards 30, thus, avoiding interference with the rotative movement of the tractor driving wheels. In this connection, it may be noted that under normal conditions, the tractor wheel lug cleaning devices, hereinbefore described, will serve to maintain the tractor wheel lugs substantially clear or free of mud or other foreign accumulations. However, under certain operating conditions, these accumulations may be passed by the cleaning devices and at such times it will be understood that the secondary cleaning devices, in form of the curved sweeping fenders 31 will serve to thoroughly remove any accumulations therefrom which will interfere with rotation of the tractor driving wheels, or which would clog the passage of said wheels during their rotation by the fenders or guards 30.

In operation of my improved tractor wheel lug cleaning devices, it will be understood that to engage the cleaners with the tractor driving wheel treads, the manual operating lever 22 is locked upon its mounting bracket 24 in a direction to impart inward rocking or swinging movement to the arm 19, which, because of its fixed connection with the carrying shaft 4, will rotate said shaft in a direction to effect movement of the free ends of the cleaners into scraping engagement with the intermediate tread portions of the tractor driving wheels. Thus, with rotation of the tractor driving wheels by these cleaners, they will serve as effectual means for removing mud or other débris therefrom and from the traction lugs 3 of said wheels, hence, insuring effectual traction of the wheels at all times. Should, for any reason, the cleaners engaging the aforesaid intermediate paths upon the tractor wheels, shift laterally with respect to said treads to such an extent as to cause the free extremities of said cleaners to unduly engage with the traction lugs 3, it will be understood that with the imparting of an upward thrust to said cleaners from the lugs 3 upon the rotating wheels 2, the carrying shaft 4 will be thrust outwardly and laterally with respect to the supporting bracket 5 provided therefor, hence, permitting said free ends of the cleaner or cleaners to be automatically disengaged from the traction lugs without damaging the same or adjacent portions of the tractor, or for that matter, the cleaning device. Because, however, of the engagement of the expansible coiled springs 9 about the inner extremities of the rods 7, it will be understood that immediately with automatic disengagement of the cleaners from the traction lugs, said springs will serve to return the carrying shaft to its normal innermost position, that is, adjacent to the outer side of the depending portion of the supporting bracket 5, as is shown in the Figures 1 and 3. During this outward movement of the carrying shaft 4 with engagement of the cleaners with any of the traction lugs 3, it will be understood that the positioning or adjustment of the manual operating lever 22 will not be disturbed, inasmuch as the spring compensating connection between the sectional connecting rod comprising the sections 20 and 20' will compensate therefor. Thus, damaging of the manual operating lever or those portions of the device connected thereto will be prevented.

Obviously, by varying the pivotal adjustment of the manual operating lever 22 with respect to the toothed segment 26, the stress or degree of pressure with which the cleaners are engaged with the treads of the tractor wheels may be varied to the desired nicety.

Manifestly, the construction shown is capable of considerable modification and such modifications as are within the spirit of my claims, I consider within the scope of my invention.

What I claim is:

1. A device of the character described comprising a shaft disposed transversely of a portion of a tractor platform, bracket arms having bearings upon their outer ends receiving and rotatably supporting said shaft, a transversely disposed supporting bar secured to the under side of a portion of the tractor platform in proximity to the tractor drive wheels, portions of said bracket arms being slidably received in and supported upon said supporting bar, the bearings upon the bracket arms normally having bearing upon the adjacent portions of the outer side of the supporting bar, coiled springs engaged about the inner and opposite portions of said bracket arms having bearing at certain of their ends upon the supporting bar, adjustable followers engaged with the extremities of said bracket arms and having bearing engagement with the remaining ends of said springs, cleaners fixedly mounted upon the opposite portions of said shaft, and manually operable means connected to the shaft for rocking the same whereby to bring said cleaners into or out of engagement with the said portions of the tractor drive wheels.

2. In combination with the rockable shaft of a tractor wheel lug cleaning device having diametrical openings formed in opposite portions thereof, a pair of brackets having portions of the same formed to have snug embracing engagement with those portions of said shaft in proximity to said diametrical openings, wheel lug cleaning fingers having portions of the same snugly received in longitudinally disposed channels formed in the adjacent faces of said brackets and extending therefrom, bracing arms positioned adjacent certain of the sides of said fingers and extending longitudinally of the same for portions of their respective lengths, said fingers, bracing arms and brackets each having an opening formed therein adapted to be aligned with the aforesaid relative positioning of the same, and connecting bolts passing through the diametrical openings in said shaft and through the aligned openings in the aforesaid brackets, fingers and bracing arms whereby to connect the latter to said shaft.

In witness whereof I have hereunto set my hand.

CHARLES E. WEBBER.